United States Patent [19]

Rafalow

[11] Patent Number: 4,660,450
[45] Date of Patent: Apr. 28, 1987

[54] PORTABLE GUIDE FOR POWER SAW

[76] Inventor: Philip Rafalow, 4135 Sora Common, Fremont, Calif. 94536

[21] Appl. No.: 787,605

[22] Filed: Oct. 15, 1985

[51] Int. Cl.$^4$ .................... B27B 5/18; B27B 9/04
[52] U.S. Cl. ..................... 83/467 R; 83/471.2; 83/574; 83/827
[58] Field of Search ............ 83/471.2, 574, 467, 83/468, 485, 489, 827, 828, 471.3; 144/286 R, 234 D, 236 C; 269/291, 303–306, 315

[56] References Cited

U.S. PATENT DOCUMENTS

| | | | |
|---|---|---|---|
| 2,630,146 | 3/1953 | Vantuyl | 83/574 |
| 2,630,147 | 3/1953 | Garberg | 83/574 |
| 2,739,624 | 3/1956 | Haddock | 83/574 X |
| 2,903,026 | 9/1959 | Frydenlund | 83/574 X |
| 2,941,554 | 6/1960 | Long | 83/574 |
| 3,379,228 | 4/1968 | Carlberg et al. | 83/471.2 |
| 3,384,135 | 5/1968 | Frydenlund | 83/471.3 |
| 3,827,326 | 8/1974 | Martin | 83/574 X |
| 3,866,496 | 2/1975 | Payne et al. | 83/574 X |
| 4,105,055 | 8/1978 | Brenta | 83/574 X |
| 4,213,364 | 7/1980 | Sahlin | 83/574 X |
| 4,327,619 | 5/1982 | McNamer, Jr. | 83/471.3 |

Primary Examiner—James M. Meister
Attorney, Agent, or Firm—T. R. Zegree

[57] ABSTRACT

A portable, frameless, self-supporting guide for circular power saws comprises an elongated base plate affixed to a single L-shaped bar on one side and to a strip on the other side thereof. A pair of parallel cross rails is fixedly disposed above the base plate for slidable movement of a power saw thereby producing true right angle cuts or mited cuts in a workpiece in a safe and efficient manner.

16 Claims, 5 Drawing Figures

U.S. Patent   Apr. 28, 1987   4,660,450

PORTABLE GUIDE FOR POWER SAW

BACKGROUND OF THE INVENTION

The present invention relates to a portable guide means for a circular power saw. More particularly, the invention relates to a portable device adapted for guiding a power-driven circular saw during cutting operation of wood or other materials.

In my copending application Ser. No. 399,429 I have described a guide for power saw comprising a base plate secured to a frame consisting of two parallel L-shaped bars on each side thereof and provided with a pair of cross rails adapted for movement of the saw thereon.

Other guides for power saws have also been described in the patent literature. For example, U.S. Pat. No. 4,237,762 describes a frame for guiding a hand-held tool adapted for cutting timber boards lengthwise consisting of a pair of guides, one of which being fixed, the other being detachably secured to a pair of crosspieces. U.S. Pat. No. 4,213,364 discloses a device for guiding a portable power saw comprising a base plate, two guiding bars supported at one end thereof by two blocks and a pivotably arranged adjustable support. U.S. Pat. No. 4,105,055 teaches a portable case containing a collapsible table comprising a rectangular frame and four removable legs. U.S. Pat. No. 3,866,496 describes a sheetboard cutting machine comprising an upstanding support frame with a saw guide provided with a turntable for a portable saw. In U.S. Pat. No. 3,827,326, a cutter guide table including a combination of a support table, measurement indicia, changeable guide and backstop components is disclosed. U.S. Pat. No. 2,903,026 teaches a guide for saws adapted for attachment to a work bench comprising a pair of adjustable rails for carrying the saw to provide a selection of miter angles. U.S. Pat. No. 2,739,624 describes an adjustable table for hand saws including a miter frame adjustable to different angles by means of a protractor. U.S. Pat. No. 2,630,147 discloses a power saw guide secured to the top of a work bench including a pair of guide bars, one of which being adjustable. U.S. Pat. No. 2,630,146 discloses a guide for a portable electric saw having a frame pivoted on a horizontal axis to raise or lower the saw with respect to the workpiece.

While my copending application and the above-mentioned prior art patents describe various concepts of guides for power saws, the improved guide of the present invention provides a new approach to the structure of such devices as it is characterized by certain novel features and advantages not heretofore known in the art.

OBJECTS OF THE INVENTION

Accordingly, it is the main object of the invention to provide an improved portable guide especially adapted for use in conjunction with circular power saws in producing consistently right angle crosscuts of a workpiece in a safe manner.

Another object of the invention is to provide a lightweight guide for a power-driven saw which can easily be carried by hand in a workshop or to a construction site.

A further object of the invention is to provide a circular saw guide capable of producing accurately multiple crosscuts from a workpiece to predetermined equal lengths.

A further object of the invention is to provide a guide which is suitable for use with most of circular power saws mounted on feet of different sizes.

A still further object of the invention is the provision of a frameless guide characterized by easy access from its front lateral side to a workpiece to be cut.

A still further object of the invention is to provide a highly efficient in performance and time-saving guide for circular electric saws characterized by its simple construction and which can be made inexpensively from readily available materials.

These and other objects of this invention will become more fully apparent from the following description when considered in conjunction with the accompanying drawing.

BRIEF SUMMARY OF THE INVENTION

In accordance with the preferred embodiment of the present invention, a portable, self-sustaining rigid guide for use with a circular power saw comprises essentially, in combination, (a) an elongated, flat, rectangular base plate having two sections separated by a transverse spacing therebetween; (b) a single L-shaped bar disposed along rear side of said base plate, said bar having an upwardly extending vertical flange and an inwardly extending horizontal flange secured to said base plate; (c) a U-shaped recess in mid-portion of said vertical flange; (d) a flat, elongated strip secured to front side of said base plate underneath thereof; (e) a pair of spaced apart L-shaped brackets secured under said base plate to the front side thereof; and (f) a pair of horizontally disposed, spaced apart, opposing, parallel L-shaped cross rails affixed to said L-shaped brackets and to said vertical flange, said cross rails being positioned above said base plate adjacent said recess for reciprocal slidable movement of a power saw thereon and extending outwardly beyond the width thereof.

DETAILED DESCRIPTION

Figure 1:
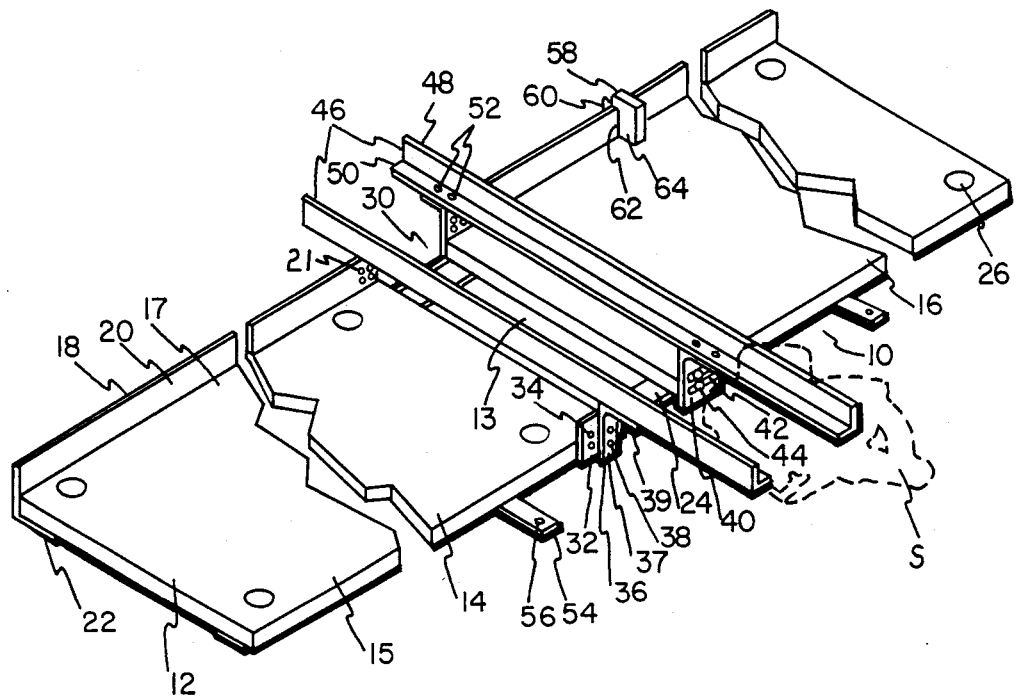
FIG. 1 is a fragmentary perspective view of the guide according to the invention showing a power saw in broken lines placed on the rails.
Figure 2:
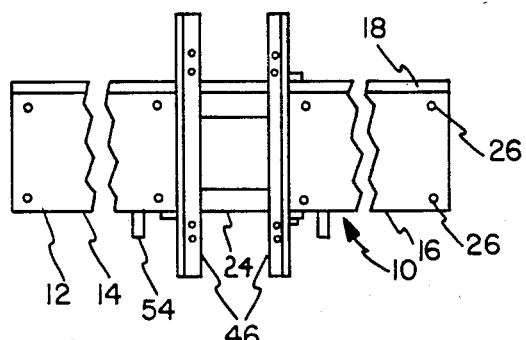
FIG. 2 is fragmentary plan view of the guide.
Figure 4:
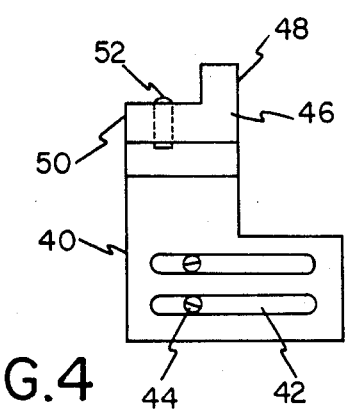
FIG. 4 is an enlarged side elevational view of an adjustable bracket joined to a cross rail.

Referring now to FIGS. 1–5 of the drawing, wherein similar reference characters designate corresponding elements, the guide 10 of the invention comprises a rectangular, elongated flat base plate 12 formed by a first section 14 and second section 16, both sections being disposed in the same plane and being separated from each other by a transverse spacing 13 of substantial width therebetween in the central area of base plate 12, thereby providing a wide, free passageway for a blade of a circular power saw during cutting operations. An L-shaped bar 18 extending along the entire rear side 17 of base plate 12 comprises a vertical flange 20 disposed upwardly and a horizontal flange 22 disposed inwardly, the edge portions of rear side 17 of base plate 12 bearing against the inner surface of vertical flange 20. A flat, elongated strip 24 of substantially the same length, thickness and width as horizontal flange 22 of L-shaped bar 18 is disposed on the front side 15 of base plate 12 underneath the edge portion thereof so that strip 24 and horizontal flange 22 are positioned in the same plane, the base plate 12 being supported by the upper surfaces of strip 24 and flange 22 and firmly secured thereto by a plurality of suitable fastening means, such as countersunk bolts 26 passing through aligned openings (not shown) in base plate 12, strip 24 and flange 22. Bolts 26 may be provided with washers (not shown) inserted on both sides of base plate 12 between the underside thereof and nuts 27. It is to be noted that the major portion of front side 15 of base plate 12 with the exception of brackets 32 is unobstructed to permit feeding of a workpiece under angle, if desired, with respect to the longitudinal direction of base plate 12. To protect the top of a table or any other surface on which guide 10 may be placed for sawing operation from possible scratches or mars and to prevent accidental slippage thereof, resilient protective pads, such as rubber or plastic grommets 28 may be mounted tightly on the exposed portions of bolts 26 and nuts 27 on the underside of base plate 12, thereby covering sharp edges thereof.

Figure 3:
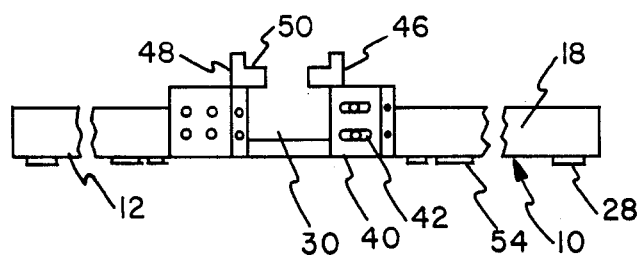
FIG. 3 is a fragmentary front elevational view of the guide.

The vertical flange 20 of L-shaped bar 18 is provided with a U-shaped recess 30, as shown in FIG. 3, located in the midportion of flange 20, the horizontal portion of the U being disposed slightly below the level of the bottom surface of base plate 12 and having a width substantially equal to that of spacing 13 between first section 14 and second section 16 thereof. Both vertical portions of the U are parallel and extend from the top edge of vertical flange 20 downwardly to the horizontal portion of the U.

Two L-shaped brackets 32 spaced apart from each other are secured to base plate 12 by riveting or welding or screws on each side of U-shaped recess 30 at the front side 15 thereof by placing the horizontal portion of each bracket 32 between the underside of base plate 12 and the top surface of strip 24, the fasteners being inserted upwardly into base plate 12 through predrilled apertures in strip 24 and in the horizontal portions of brackets 32. Each of the brackets 32 comprises at least one pair of vertically aligned holes 34, preferably three pairs of holes of the same size arranged in a substantially equally spaced relation, the lower holes being located slightly above the top surface of base plate 12. The vertical flange 20 of L-shaped bar 18 is likewise provided with at least one pair, preferably three pairs, of vertically aligned holes 21 arranged in a substantially equally spaced relation, holes 21 being located adjacent U-shaped recess 30. Holes 21 and 34, which may be interiorly threaded to accomodate 10/32 in. machine screws, are mutually aligned in cooperating relationship to receive fastening means, such as screws or bolts and nuts, for securing cross rails 46 described hereinafter to brackets 32 and vertical flange 20 of bar 18.

To hold base plate 12 in a substantially horizontal position, a pair of flat, rectangular spacers (not shown) of approximately the same size as horizontal portion of L-shaped brackets 32 is inserted between the underside of base plate 12 and the top surface of horizontal flange 22 of L-shaped bar 18 adjacent U-shaped recess 30.

Guide 10 further comprises a pair of horizontally disposed, spaced apart, opposing, parallel L-shaped cross rails 46 adapted for free slidable movement thereon of a circular power saw S mounted on a conventional foot therefor. Rails 46 are disposed above base plate 12 at a substantially right angle to the longitudinal direction thereof over a distance corresponding approximately to that between the bottom of the saw mounting foot and the bottom edge of a saw blade. Both rails 46 are open-ended to permit easy placing of a power saw thereupon on either side thereof and are rigidly secured to vertical flange 20 of L-shaped bar 18 in a location adjacent recess 30 and to brackets 30 secured to the front side 15 of base plate 12. Each rail 46 includes a vertical flange 48 and a horizontal flange 50, the latter extending inwardly toward the opposing rail. The free ends of rails 46 on each side of guide 10 project outwardly beyond the width thereof to facilitate a reciprocal movement of a portable power saw during cutting operation. To insure stability of guide 10 when saw S is positioned at rest at its starting point prior to the cutting action, a pair of spaced apart pivotable outriggers 54 which may be provided with a hole 56 for securing to a support surface when extended from under the base plate 12 at about right angle thereto, as shown in FIG. 1, are attached to the bottom of strip 24 by any suitable fastening means, such as countersunk bolts or the like. The space between vertical flanges 48 of cross rails 46 conforms substantially to the width of the saw mounting foot and slightly exceeds spacing 13 in base plate 12.

Although the overhanging portion of cross rails 46 should generally be not less than about 2 in. (5 cm.) on each side for a saw mounting foot about 12 in. (30 cm.) long, it is preferred to provide an overhang about 8 in. (20 cm.) long at the starting point side of rails 46 so that the weight of the saw is evenly distributed thus preventing the saw from tipping over. A shorter overhang about 4 in. (10 cm.) long on the opposite side of rails 46 at the rear side 17 of base plate 12 where the cut is finished may be sufficient, although an overhang of about 8 in. (40 cm.) is preferred.

Figure 5:
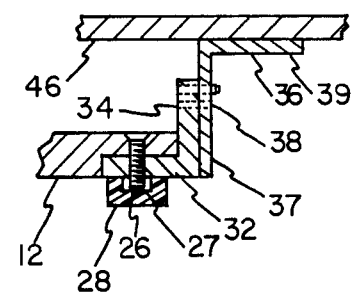
FIG. 5 is an enlarged partial sectional side elevational view of the guide showing detail of means of securing a cross rail to the base plate.

Both cross rails 46 are adjustably affixed to guide 10 in a secure manner by suitable fasteners, preferably by two inverted L-shaped mounting brackets 36 affixed to one of the rails and by two adjustable brackets 40 secured to the other rail. The vertical legs 37 of brackets 36 are detachably joined to the outside surface of vertical flange 20 and outside surface of bracket 32 preferably by bolts and nuts, as shown in FIG. 5, after the bolts have been passed through predrilled precisely threaded holes 38 in flange 20 and legs 37, while each of the horizontal legs 39 of brackets 36 is secured permanently to horizontal flanges 50 of each rail 46 by small rivets or counter sunk bolts 52 passed through holes predrilled in flanges 50 and legs 39. Accordingly, rails 46 together with brackets 36 and 40 affixed thereto constitute a unitary element which can easily be attached to guide 10 or detached therefrom for replacement when rails 46 have been damaged or for mounting thereof in different positions to accomodate saws having feet of varying widths.

One of the important features of the invention is the provision of a pair of adjustable brackets 40, each bracket comprising a pair of vertically aligned, parallel, transverse slits 42 cooperating with holes 34 in brackets 32 and holes 21 in vertical flange 20. Adjustable brackets 40 are secured on opposite sides of guide 10 in any desired position by passing a screw or the like fastening means through a selected pair of vertically disposed holes in vertical leg 37 of bracket 36 and cooperating holes 21 in vertical flange 20 on the opposite side of guide 10. Accordingly, the transverse slits 42 permit adjustment of the space between cross rails 46 to accomodate practically all the circular power saws in use having different widths of their foot.

Another important feature of the invention is that cross rails 46 are reversible, i.e. they can be mounted on either side of spacing 13 in base plate 12 to allow either right or left position of a circular saw blade for clear passage through spacing 13.

When it is desired to produce from a work piece multiple cuts of substantially the same predetermined length, guide 10 may be provided with a sliding single stop member 58, shown in FIG. 1, which is mounted adjustably on vertical flange 20 of bar 18 for locking engagement therewith by means of a thumb screw 60 or the like fastener. Stop member 58 includes a vertical slit 62 in its upright wall 64 extending from the bottom of stop member 58 to its upper portion below its upper edge and being slightly wider than the thickness of flange 20 so that it can slide easily thereon a short distance above the top surface of base plate 12 to a position of desired adjustment to a predetermined length of short cuts from a long workpiece. Slidable stop member 58 is particularly advantageous in making a large number of pieces of uniform size from a long piece of lumber, for example in the construction of a house. Before a long workpiece is cut into segments of equal size, it is placed on base plate 12 with its front edge abutting against the vertical wall 64 of stop member 58 so that the desired length of such segments corresponds substantially to the distance between wall 64 of stop member 58 and the vertically positioned blade of saw S.

The novel structure of frameless guide 10 with unobstructed access to the surface of base plate 12 from its front side 15 permits placing a workpiece to be cut on top of base plate 12 in the first section 14 thereof at any selected angle to the line of travel of the saw blade and press it by hand while moving it toward the saw blade. For precise mited cuts, a triangle adjustable to any angle up to 90° may be employed by placing it at a selected angle on the top surface of a workpiece. The conventional triangle may be modified by affixing to the bottom thereof a few rubber grommets, for example six grommets, at least about ⅜ in. (1 cm.) high in order to raise the overall height of the triangle to ½ in. (1.3 cm.) or even a little more, but not exceeding the height of vertical flange 20 of bar 18 against which the triangle abuts. Moreover, to facilitate the movement of the triangle, an upright guide means may be secured to two edges thereof, i.e. one edge between the acute and the straight angle and the other edge between both acute angles, and slidingly attached to vertical flange 20 by means of a suitable clip.

To appreciate the dimensions of guide 10 described herein in its preferred embodiment, the length of base plate 12 may vary from about 1 ft. to 8 ft. (30 cm. to 240 cm.), its length of about 4 ft. (120 cm.) being generally satisfactory. Although its width may vary from about 4 in. (10 cm.) to 48½ in. (123 cm.) to accomodate 4 ft. (120 cm.) sheets of plywood, the frequently applicable width of base plate 12 is about 12 in. (30 cm.). While the length of cross rails 46 may vary to a certain extent depending on the width of guide 10, their preferred length is about 24 in. (60 cm.) for a guide of about 12 in. (30 cm.) width with an overhang of about 8 in. (20 cm.) on both sides thereof. The wall thickness of L-shaped bar 18 and of strip 24 should be sufficient to insure their respective rigidity and adequate structural strength in supporting base plate 12. In general, a thickness of such two members of about ½ in. (1.3 cm.) is quite adequate, while a thickness of cross rails 46 of about ¼ in. (0.6 cm.) is satisfactory for support of a 7¼ in. (18 cm.) circular power saw.

While guide 10 is preferably constructed of a substantially rigid, durable, lightweight metal, such as architectural aluminum, other materials, such as steel, wood, sturdy plastic or combinations thereof may likewise be employed. Base plate 12 is preferably made of plywood having smooth, level top surface or from other woody materials, such as lumber, particle board and the like. To increase its durability, the top surface of a woody base plate 18 may be treated with a preservative imparting water resistance and improving its smoothness. If the L-shaped bar 18, the strip 24 and the rails 46 are made of a plastic material, they may be joined by a strong adhesive.

In operation, guide 10 is placed unattached on any convenient flat surface, such as a table, a bench, or a pair of sawhorses, with the foot of a circular power saw positioned on cross rails at the starting end thereof. A workpiece, such as lumber stock, plywood sheet, fiberboard, ceramic sheet, etc. is fed manually on the top of the first section 14 of the base plate in the direction of spacing 13 therein until its leading edge is stopped by the front wall 64 of stop member 58 locked on vertical flange 20 at a point corresponding to the desired length of crosscuts. The bottom edge of the rotating blade of the saw S extends about ⅛ in. below the top surface of base plate 12 and the saw is advanced on rails 46 at right angle to the plane of the workpiece cuts through the thickness thereof while entering into the area of spacing 13. When the cut is completed, the saw is moved slidably back on rails 46 to its original starting position, the portion of the workpiece to be cut is manually advanced until it abuts stop member 58 and the sawing operation is repeated a number of times to produce a desired quantity of short pieces of equal size.

It will be apparent from the foregoing description that I have devised a practical portable guiding device for circular power saws which is useful, particularly in the building trade, to carpenters and general contractors in producing true 90° multiple crosscuts or mited cuts of a sheet material with a high degree of accuracy. The essential components of the guide of the invention are fixedly assembled prior to its use in a sawing operation so that the guide is ready to use as a truly portable single unit without requiring any dismantling and reassembling of its components. The stop member is ultimately locked in a selected location of the L-shaped bar before cutting of a workpiece begins. The dimensions of various elements of the guide may, of course, be varied to suit a particular model or size of a saw to be used therewith.

A significant feature of the invention resides in an improved and simplified construction of the guide which is lightweight, easy to carry, yet sturdy and gives a highly efficient and safely performed sawing operation producing accurately cuts of equal predetermined size, including miter and compound miter cuts.

Another feature of the invention is that the guide is frameless, yet self-supporting not requiring any means for clamping to a separate support and having no legs or other collapsible elements. Due to the simplicity of its ready-to-use design, the guide may be produced at a very low cost to fit practically all the models of 7¼ in., as well as 6¼ to 13 in. saws. Various angular crosscuts, for example 60° or 45°, can also be achieved using a triangle adjusted to the desired angle as mentioned hereinabove.

While the guide of the invention is useful primarily for circular power saws, it may likewise be used with routers. The central spacing provided between the two sections of the base plate permits a passage of any type or size of a circular power saw now in use as it provides clearance for guard rail of the saw passing therethrough while the saw blade engages a workpiece, thereby preventing violation of strict requirements placed by O. S. H. A. on manufacturers of power saws.

It will be understood that various modifications in the form, size or constructional details of the guide herein described in its examplary embodiment may be made without departing from the spirit thereof or the scope of the claims which follow.

I claim:

1. A portable, self-sustaining, rigid guide for use with a circular power saw comprising, in combination:
    (a) an elongated, flat, rectangular base plate having two sections separated by a transverse spacing therebetween;
    (b) a single L-shaped bar disposed along rear side of said base plate, said bar having an upwardly extending vertical flange and an inwardly extending horizontal flange secured to said base plate;
    (c) a U-shaped recess in midportion of said vertical flange;
    (d) a flat, elongated strip secured to front side of said base plate underneath thereof;
    (e) a pair of spaced apart L-shaped brackets secured under said base plate to the front side thereof; and
    (f) a pair of horizontally disposed, spaced apart, opposing, parallel L-shaped cross rails affixed to said L-shaped brackets and to said vertical flange, said cross rails being positioned above said base plate adjacent said recess for reciprocal slidable movement of a power saw thereon and extending outwardly beyond the width thereof.

2. The guide of claim 1 wherein said base plate is secured to upper surface of said strip and to upper surface of said horizontal flange by a plurality of fastening means.

3. The guide of claim 2 wherein exposed portion of said fastening means under said base plate is covered by a protective pad.

4. The guide of claim 1 wherein said cross rails are disposed at a substantially right angle to longitudinal direction of said base plate and spaced from each other a distance approximately equal to said transverse spacing between said two sections.

5. The guide of claim 1 wherein a single stop member is slidably mounted on said vertical flange for adjustment of multiple cuts of a workpiece to a predetermined equal length.

6. The guide of claim 1 wherein each of said L-shaped brackets comprises at least one pair of vertically aligned holes.

7. The guide of claim 1 wherein each of said L-shaped brackets comprises three pairs of holes aligned vertically in a substantially equally spaced relation.

8. The guide of claim 6 wherein said vertical flange of said L-shaped bar is provided with at least one pair of vertically aligned holes located adjacent said U-shaped recess on each side thereof and horizontally aligned with the holes in said L-shaped brackets.

9. The guide of claim 7 wherein said vertical flange of said L-shaped bar is provided with three pairs of vertically aligned holes arranged in a substantially equally spaced relation.

10. The guide of claim 9 wherein the holes in said L-shaped brackets and the holes in said vertical flange are mutually aligned in cooperating relationship.

11. The guide of claim 1 wherein one of said cross rails is affixed to a pair of spaced, inverted L-shaped mounting brackets adapted for securing to said L-shaped brackets secured to the front side of said base plate and to the vertical flange of said L-shaped bar, the other cross rail being affixed to a pair of adjustable brackets comprising a pair of vertically aligned transverse slits cooperating with the holes in said L-shaped brackets and the holes in said vertical flange.

12. The guide of claim 1 wherein said transverse spacing between the two sections of said base plate provides a wide, free passageway for a blade of a circular power saw.

13. The guide of claim 1 wherein the space between said cross rails is adjustable to accomodate circular saws mounted on feet of varying widths.

14. The guide of claim 1 wherein said cross rails are positioned so as to permit the bottom edge of a circular saw placed thereon to extend about ⅛ inch below the top surface of said base plate.

15. The guide of claim 1 wherein a pair of flat spacers is inserted between the underside of said base plate and the top surface of said horizontal flange of said L-shaped bar to hold said base plate in a substantially horizontal position.

16. The guide of claim 1 wherein a pair of spaced apart pivotable outriggers are attached to the bottom of said strip on each side of the spacing in said base plate.

* * * * *

UNITED STATES PATENT AND TRADEMARK OFFICE
CERTIFICATE OF CORRECTION

PATENT NO. : 4,660,450

DATED : April 28, 1987

INVENTOR(S) : Philip Rafalow

It is certified that error appears in the above-identified patent and that said Letters Patent is hereby corrected as shown below:

The sheet of Drawing consisting of Figure 5 should be deleted to appear as per attached sheet.

UNITED STATES PATENT AND TRADEMARK OFFICE
CERTIFICATE OF CORRECTION

PATENT NO. : 4,660,450    Page 2 of 2
DATED : April 28, 1987
INVENTOR(S) : Philip Rafalow It is certified that error appears in the above-identified patent and that said Letters Patent is hereby corrected as shown below:

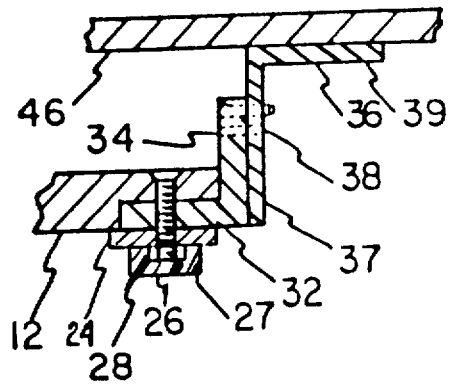

FIG.5

Signed and Sealed this

Eleventh Day of August, 1987

Attest:

DONALD J. QUIGG

Attesting Officer        Commissioner of Patents and Trademarks